(No Model.)
J. F. BECKER.
HAME AND COLLAR FASTENER.
No. 290,661.  Patented Dec. 25, 1883.
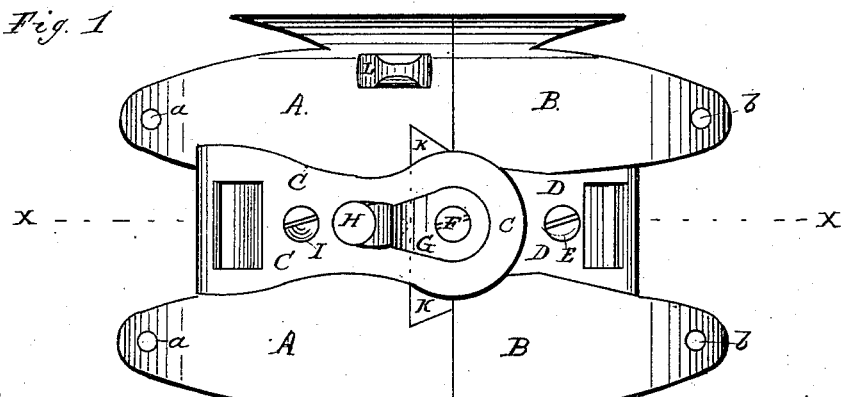
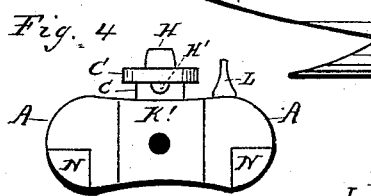
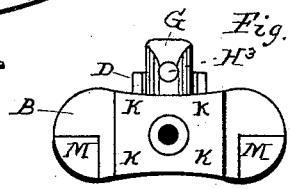
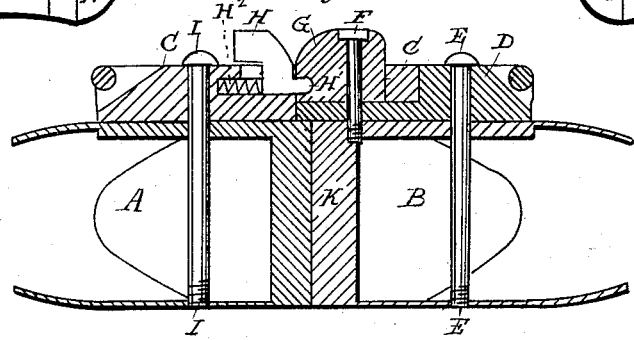
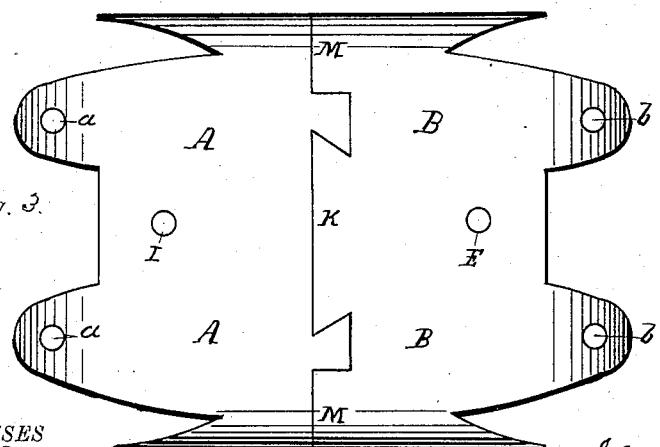
WITNESSES  
Morton Toulmin  
INVENTOR  
John F. Becker  
N. W. Fitzgerald & Co.  
Attorney
N. PETERS, Photo-Lithographer, Washington, D. C.

UNITED STATES PATENT OFFICE.

JOHN F. BECKER, OF WARD, MINNESOTA.

HAME AND COLLAR FASTENER.

SPECIFICATION forming part of Letters Patent No. 290,661, dated December 25, 1883.

Application filed June 19, 1883. (No model.)

*To all whom it may concern:*

Be it known that I, JOHN F. BECKER, a citizen of the United States, residing at Ward, in the county of Todd and State of Minnesota, have invented certain new and useful Improvements in Hame and Collar Fasteners; and I do hereby declare the following to be a full, clear, and exact description of the invention, such as will enable others skilled in the art to which it appertains to make and use the same.

This invention relates to improvements in hame and collar fasteners, and has for its object to make the fastening automatic. This object is attained by the mechanism shown in the drawings forming a part of this specification, in which—

Figure 1 is a plan taken from the top. Fig. 2 is a longitudinal section on the line $xx$, Fig. 1. Fig. 3 is a view taken from the underside. Figs. 4 and 5 are views of the two halves of the fastener when taken apart, and show how they come together.

The letter A represents one end of the fastener, and the letter B the other end.

C is a metal plate secured to the end A by the screw or rivet I. It is provided with a sliding bolt, H, in the rear of which is a spiral or other spring, $H^2$, which bears against the bolt and forces it in an outward direction and causes it to enter a recess, $H^3$, in the post G, and thus locks the two ends of the fastener together. The post H is attached to the bolt $H^2$, and moves with it in a slot in the plate C. By pushing the post H in a backward direction the bolt $H^2$ may be disengaged from the recess $H^3$. One end of the plate C is in the form of a loop and projects over the end B a short distance, forming an opening of the size and shape of the post G, into which the latter enters when the two ends of the fastener are fastened to each other.

The letter D represents a plate, which is secured to the end B by the screw or rivet E.

The letter G indicates a post or standard, which is attached to the plate D and end B by the screw F. One side of this post is rounded off and inclined downwardly, for a purpose hereinafter described.

The letter K represents a dovetail, which forms a part of the end B. It is intended to enter and fit into a dovetail recess, K', of the end A. (Shown in Fig. 4.)

The letters M indicate projecting portions of the end of the fastener B. They enter the recesses N in the end A.

The letters $a$ and $b$ indicate holes for rivets or other means of attachment of the fastener to the hames or collar. When the two ends of the fastener are together and it is required to separate them, the stud or post H is pushed in a backward direction. This withdraws the bolt H from the recess $H^3$ and allows the end B to be slid (in its dovetails) in a downward direction until the end A and the end B are completely disengaged.

When it desired to make the fastening, the dovetail K of the end B is introduced from beneath into the dovetail recess K' of the end A. The end B is then pushed in an upward direction, and when the inclined rounded portion of the post G strikes the projecting end of the bolt H' the bolt is forced backward until it is exactly opposite the recess $H^3$, into which it is immediately introduced by the pressure of the spring $H^2$, thus locking the two ends of the fastener automatically together.

It is intended to manufacture the fastener of malleable iron or other suitable material.

Having described my invention, what I desire to secure by Letters Patent and to claim is—

In a hame or collar fastener, the end A, having plate C, stud H, and spring $H^2$, in combination with the end B, having plate D and post G, substantially as described, and for the purposes set forth.

In testimony whereof I affix my signature in presence of two witnesses.

JOHN F. BECKER.

Witnesses:
BARNEY BARGERT,
HENRY BECKER.